United States Patent
Hurtado et al.

(10) Patent No.: US 10,752,318 B2
(45) Date of Patent: Aug. 25, 2020

(54) BICYCLE PEDAL AND SHOE CLIP ASSEMBLY

(71) Applicants: Carlos Hurtado, Las Vegas, NV (US); Pedro Hurtado, Las Vegas, NV (US)

(72) Inventors: Carlos Hurtado, Las Vegas, NV (US); Pedro Hurtado, Las Vegas, NV (US)

( * ) Notice: Subject to any disclaimer, the term of this patent is extended or adjusted under 35 U.S.C. 154(b) by 40 days.

(21) Appl. No.: 15/928,036

(22) Filed: Mar. 21, 2018

(65) Prior Publication Data

US 2018/0281895 A1    Oct. 4, 2018

Related U.S. Application Data

(60) Provisional application No. 62/477,978, filed on Mar. 28, 2017.

(51) Int. Cl.
| | |
|---|---|
| *B62M 3/08* | (2006.01) |
| *F16B 2/20* | (2006.01) |
| *F16B 2/10* | (2006.01) |
| *A43B 5/14* | (2006.01) |
| *A43C 15/16* | (2006.01) |

(52) U.S. Cl.
CPC ............. *B62M 3/086* (2013.01); *F16B 2/10* (2013.01); *F16B 2/205* (2013.01); *A43B 5/14* (2013.01); *A43C 15/16* (2013.01)

(58) Field of Classification Search
CPC .............. B62M 3/086; F16B 2/10; A43B 5/14
See application file for complete search history.

(56) References Cited

U.S. PATENT DOCUMENTS

| | | | |
|---|---|---|---|
| 4,538,480 A | 9/1985 | Trindle | |
| 4,856,365 A | 8/1989 | Romano | |
| 4,916,972 A | 4/1990 | DeMartin | |
| 5,115,692 A * | 5/1992 | Nagano | B62M 3/086 |
| | | | 280/11.31 |
| 5,199,324 A * | 4/1993 | Sain | B62M 3/08 |
| | | | 36/131 |
| 6,494,117 B1 | 12/2002 | Bryne | |
| 6,543,310 B1 * | 4/2003 | Baker | B62M 3/086 |
| | | | 74/594.4 |
| 7,017,445 B2 | 3/2006 | Bryne | |
| 7,877,904 B2 | 2/2011 | Bryne | |
| 8,794,106 B2 | 8/2014 | Zoumaras et al. | |

(Continued)

FOREIGN PATENT DOCUMENTS

| | | | | |
|---|---|---|---|---|
| DE | 19904114 A1 * | 8/2000 | | A43B 5/14 |
| FR | 2485226 A1 * | 12/1981 | | B62M 3/086 |

*Primary Examiner* — Thomas C Diaz
(74) *Attorney, Agent, or Firm* — Stine Law Ltd

(57) ABSTRACT

A releasable attachment assembly for releasably attaching a first item to a second item is disclosed. The assembly may be a bicycle pedal and shoe clip assembly for releasably engaging a cyclist's shoe to a pedal of a bicycle. The bicycle pedal and shoe clip assembly may comprise a shoe clip and a pedal. The shoe clip may comprise a shoe plate adapted to attach to a bottom surface of a shoe, a shoe bracket spaced from the shoe plate, and a shoe post disposed between the shoe bracket and the shoe plate. The pedal may comprise a pedal body having an integral guide slot, the guide slot adapted to receive the shoe post, and opposing grasps disposed within the guide slot. The opposing grasps may be movable between an open and a closed position to releasably secure the shoe post within the guide slot.

12 Claims, 3 Drawing Sheets

(56) References Cited

U.S. PATENT DOCUMENTS

| | | |
|---|---|---|
| 9,340,248 B2 | 5/2016 | Zoumaras et al. |
| 9,493,209 B2 | 11/2016 | Sakaue |
| 2012/0233891 A1 | 9/2012 | Woodford |

* cited by examiner

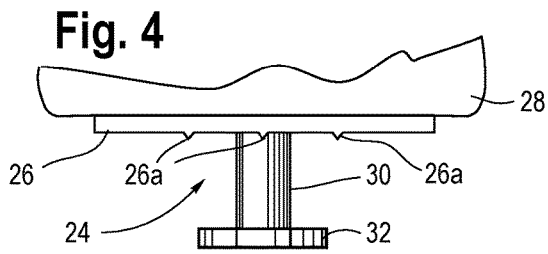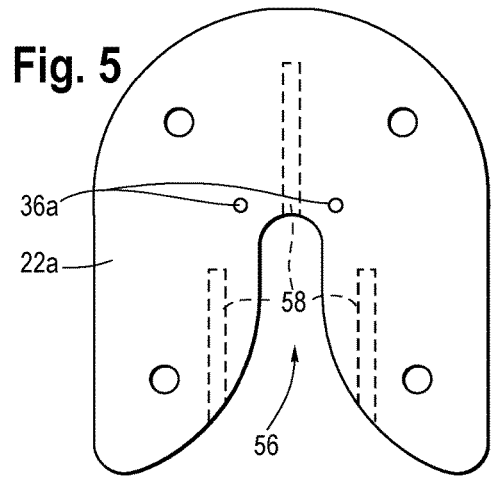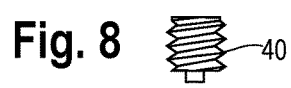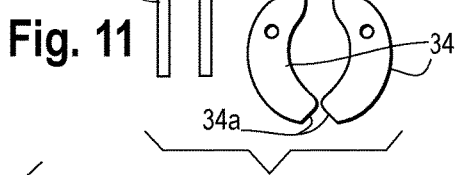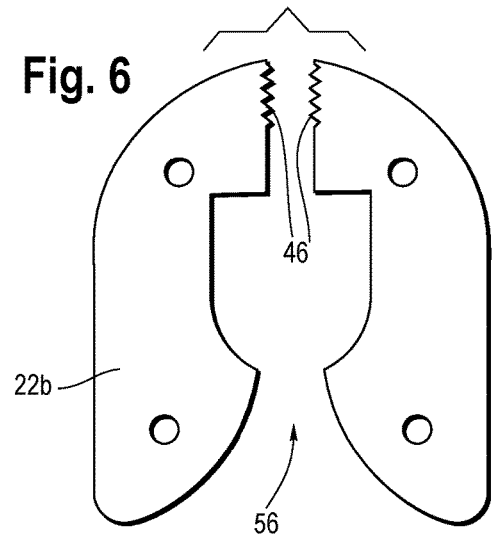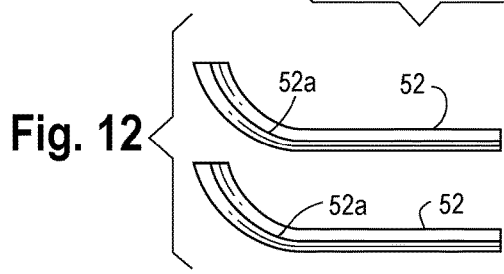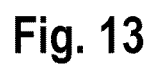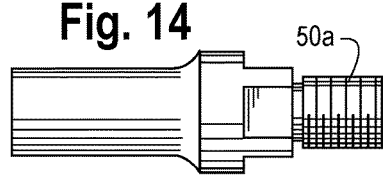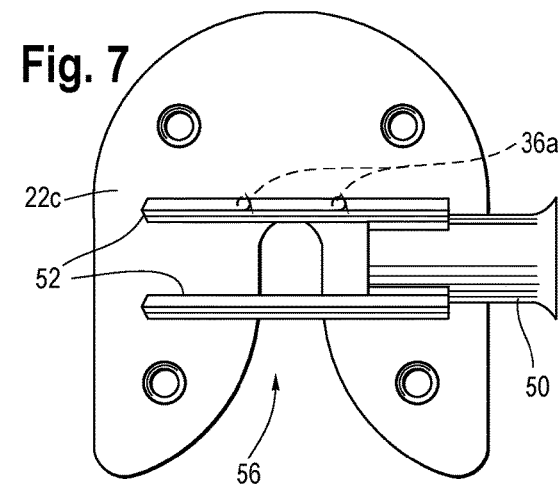

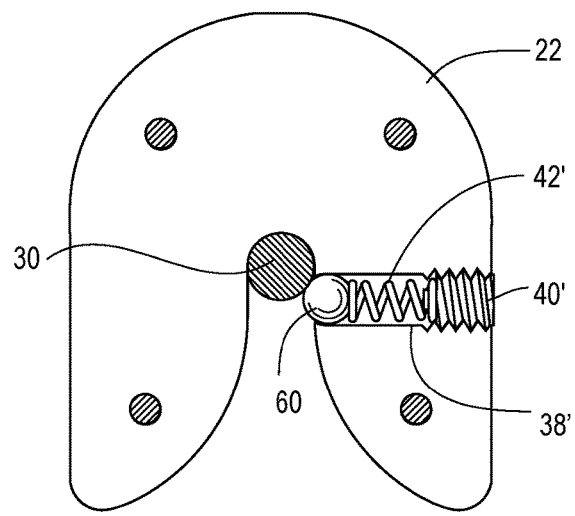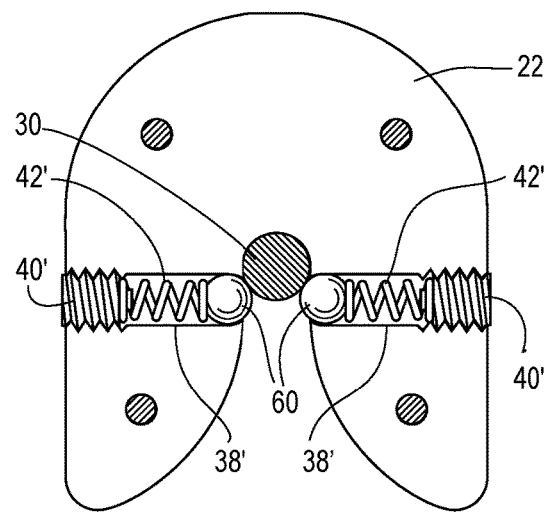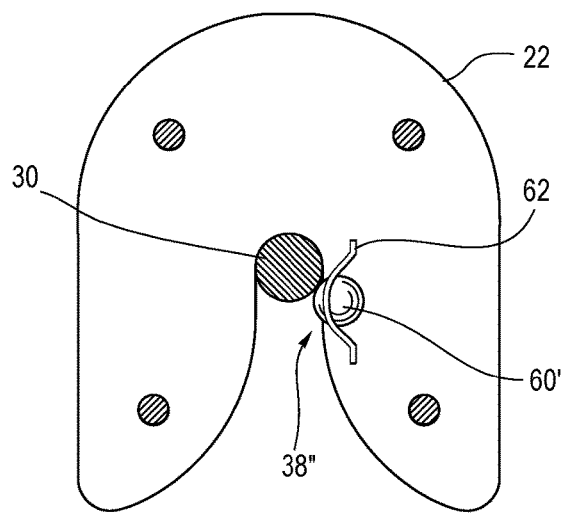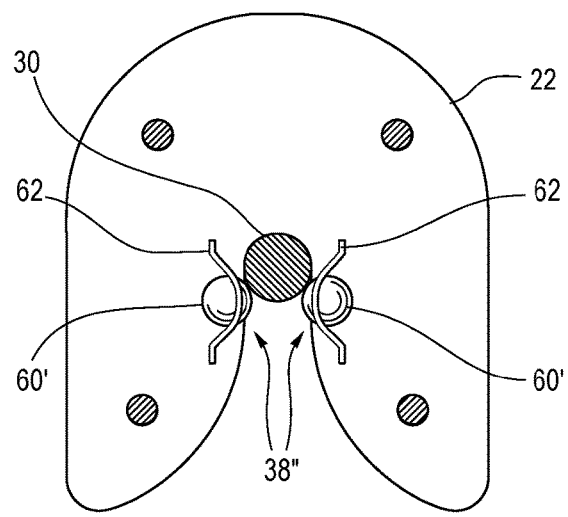

BICYCLE PEDAL AND SHOE CLIP ASSEMBLY

FIELD OF THE INVENTION

The present invention relates to an assembly for releasably securing a first item, such as a cyclist's shoes to a second item, such as the cyclist's respective bicycle pedals.

BACKGROUND OF THE INVENTION

Various devices have been disclosed for securing a first item, such as a cyclist's shoe, to a second item, such as the cyclist's respective pedal. See for example DeMartin, U.S. Pat. No. 4,916,972; and Baker et al., U.S. Pat. No. 6,543,310. However cyclists may find such devices to be rather complicated in design and difficult to utilize.

DESCRIPTION OF THE FIGURES

For a more complete understanding of the disclosure, reference should be made to the following detailed description and accompanying drawings, wherein:

FIG. 4 is a front view of the shoe clip assembly of FIG. 1;

FIG. 5 is a top view of a top plate of the bicycle pedal of FIG. 1;

FIG. 6 is a top view of a middle plate of the bicycle pedal of FIG. 1;

FIG. 7 is a top view of a bottom plate of the bicycle pedal of FIG. 1;

FIG. 8 illustrates an adjustment screw incorporated in the bicycle pedal of FIG. 1;

FIG. 9 illustrates a biasing spring incorporated in the bicycle pedal of FIG. 1;

FIG. 10 illustrates a drive pin incorporated in the bicycle pedal of FIG. 1;

FIG. 11 illustrates clasps and cooperating pivot pins incorporated in the bicycle pedal of FIG. 1;

FIG. 12 illustrates support bars incorporated in the bicycle pedal of FIG. 1;

FIG. 13 illustrates a support member incorporated in the bicycle pedal of FIG. 1;

FIG. 14 illustrates a bearing member incorporated in the bicycle pedal of FIG. 1; and FIGS. 15-18 illustrate alternative embodiments of a bicycle pedal in accordance with the present invention.

DESCRIPTION OF THE PREFERRED EMBODIMENTS

While this invention is susceptible of embodiment in many different forms, there will be described herein in detail, specific embodiments thereof with the understanding that the present disclosure is to be considered exemplifications of the principles of the invention and is not intended to limit the invention to the specific embodiments illustrated.

Figure 1:
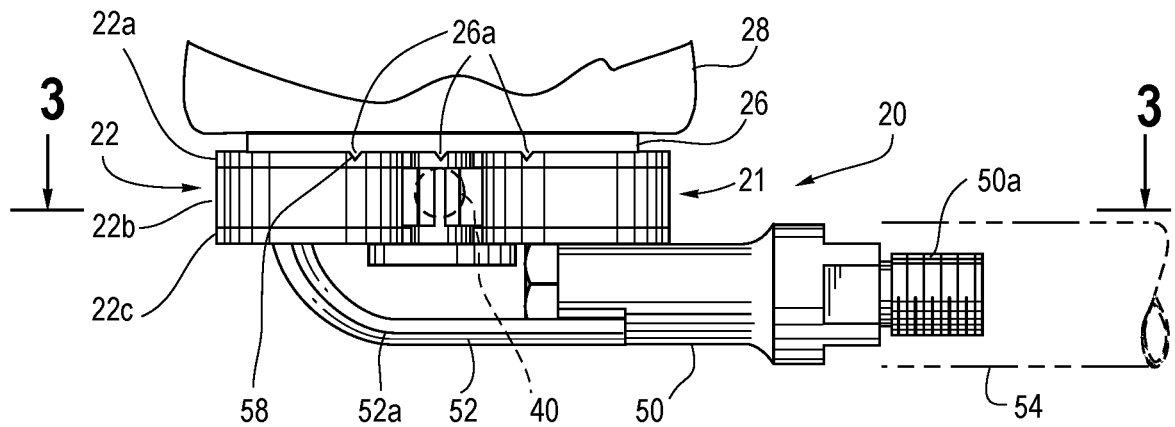
FIG. 1 is a rear view of a bicycle pedal and shoe clip assembly in accordance with the present invention.
Figure 2:
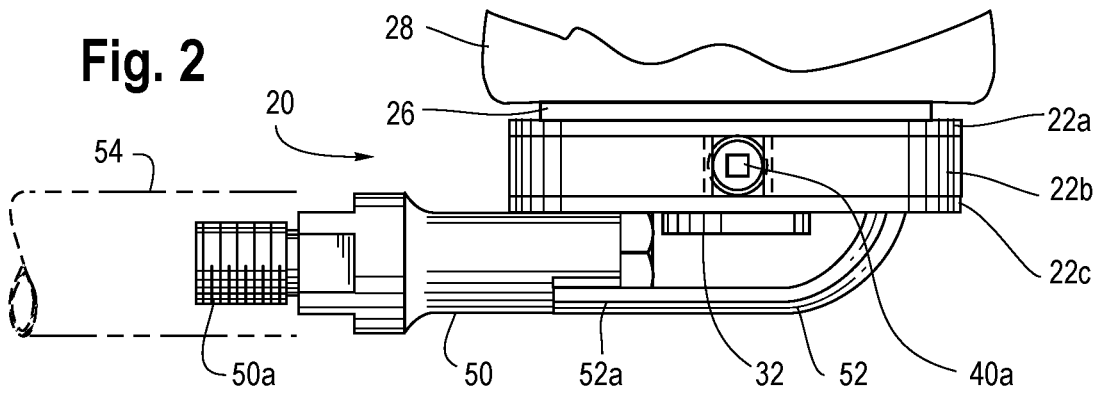
FIG. 2 is a front view of the bicycle pedal and shoe clip assembly of FIG. 1.

In accordance with the present invention, one embodiment of an assembly for releasably securing a first item, such as cyclists' shoe, to a second item, such as a cyclist's respective bicycle pedal, is illustrated in FIG. 1. In particular, the assembly may be in the form of a bicycle pedal and shoe clip assembly 20, which may comprise a bicycle pedal 21 and a cooperating shoe clip 24.

The pedal 21 may include a pedal body 22, which may be formed of three plates, comprising a top plate 22a (FIG. 5), a middle plate 22b (FIG. 6) and a bottom plate 22c (FIG. 7).

Referring to FIG. 4, the shoe clip 24 may include a shoe plate 26 which may be secured to a cycling shoe 28 by conventional means. The shoe plate 26 may be rigid or flexible, the purpose of the shoe plate 26 being to secure the post 30 and bracket 32 to the underside of a cyclists' shoe. The shoe clip 24 may also include a post 30 and a bracket 32.

Figure 3:
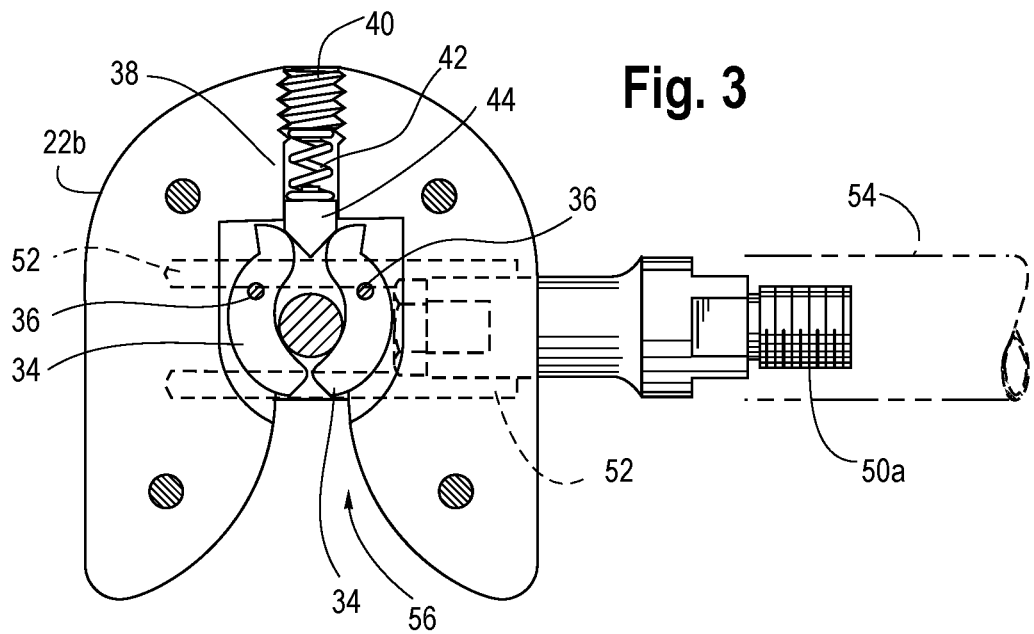
FIG. 3 is a top view of the bicycle pedal and shoe clip assembly of FIG. 1.

As particularly illustrated in FIGS. 3 and 11, the pedal 21 may include opposing grasps 34, which may pivot about respective pivot pins 36, to securely receive and grasp the post 30 of the shoe clip 24, when the post 30 is inserted between the opposing grasps 34. The opposing grasps 34 may each include a tapered face 34a, discussed below, to facilitate insertion of the posts 30 therebetween. The pivots pins 36 may be secured in respective cavities 36a to the shoe clip 26.

The pedal 21 may include a biasing assembly, generally designated 38, which may be adjustable, and which may bias the opposing grasps 34 towards a closed position, as illustrated in FIG. 3. The biasing of the opposing grasps 34 towards the closed position assists the opposing grasps to retain the post 30 when inserted therebetween.

The biasing assembly 38 may include an adjustment screw 40, which may be threaded, a biasing spring 42 and a drive pin 44. The adjustment screw 40 may include a socket 40a to receive a cooperatively shaped tool to permit adjustment thereof. Adjustment, such as by rotation, of the adjustment screw 40 may adjust the force of the drive pin 44 engaging the opposing grasps 34.

As described above, the pedal body 22 may be formed of three plates, comprising the top plate 22a (FIG. 5), the middle plate 22b (FIG. 6) and the bottom plate 22c (FIG. 7). The middle plate 22b may include a threaded surface 46 to cooperatively receive the adjustment screw 40.

The pedal 21 may further include a support member 50 and support bars 52. See in particular FIGS. 13, 14. The support member 50 may include a bearing 50a adapted for attachment to a conventional crank arm 54 of a conventional bicycle crankset (not shown). The support bars 52 may have tapered faces 52a, making the support bars 52 more aerodynamic.

The pedal body 22 may include an integral guide slot 56, which may present a generally curved arcuate face to provide a tapered entry into the guide slot 56. In practice, a cyclist may secure the cyclist's cycling shoe 28 to the pedal 21 by sliding the post 30 forward into the guide slot 56, and against the tapered faces 34a of the opposing grasps 34, while sliding the bracket 32 below the bottom plate 22c. As the post 30 is progressively slid forward, the opposing grasps 34 may spread apart to an open position, until the post 30 has been sufficiently slid forward to permit the opposing grasps 34 to return to the closed position due to the biasing assembly 38. See in particular FIG. 3.

To remove the cycling shoe 28 from the pedal 21, the cyclist may simply reverse the procedure.

The shoe plate 26 may include ribs 26a, and the top plate 22a may include complementary grooves 58 to receive the ribs 26a, facilitating proper alignment of the shoe plate 26 with the pedal body 22. This forward sliding motion may force the tapered faces 34a apart, against the bias of the biasing assembly 38. Once past the tapered faces 34a, the bias of the biasing assembly 38 closes the opposing grasps 34, thereby retaining the post 30 between the grasps 34. The force required to secure the post 30 between, and to release the post 30 from, the grasps 34 may be set by adjustment of the adjustment screw.

Alternative embodiments for retaining the post 30, and thus the shoe clip 24, to the pedal 21 are illustrated in FIGS. 15-18.

These embodiments may include one (FIG. 15) or two (FIG. 16) second biasing assemblies 38' comprising an adjustment screw 40', a biasing spring 42', and a ball bearing 60. Alternatively these embodiments may include one (FIG. 17) or two (FIG. 18) third biasing assemblies 38" comprising a leaf spring 62 and a ball bearing 60". Still further these embodiments may include the second biasing assembly 38', which permits adjustment of the bias, and an opposed third biasing assembly 38".

It is to be understood that this disclosure is not intended to limit the invention to any particular form described, but to the contrary, the invention is intended to include all modifications, alternatives and equivalents falling within the spirit and scope of the invention.

We claim:

1. A bicycle pedal and shoe clip assembly for releasably engaging a cyclist's shoe to a pedal of a bicycle, the assembly comprising a shoe clip and a pedal, wherein:
   the shoe clip comprises a shoe plate adapted to attach to a bottom surface of a shoe, a shoe bracket spaced from the shoe plate, and a shoe post disposed between the shoe bracket and the shoe plate; and
   the pedal comprises:
   a pedal body a top plate adapted to engage the shoe plate, the top plate having an integral guide slot adapted to receive the shoe post; and
   opposing grasps spaced below the top plate and inline with the guide slot, wherein the opposing grasps are movable independent of the top plate between an open and a closed position to releasably secure the shoe post within the guide slot.

2. The assembly of claim 1, including a biasing assembly for biasing the opposing grasps towards the closed position to releasably secure the shoe post within the guide slot.

3. The assembly of claim 2, wherein the biasing assembly includes a biasing spring.

4. The assembly of claim 3, wherein the biasing spring engages the opposing grasps to bias the opposing grasps towards the closed position.

5. The assembly of claim 4, including a drive member disposed between the biasing spring and the opposing grasps to bias the opposing grasps towards the closed position.

6. The assembly of claim 5, including means for adjusting the bias of the biasing assembly.

7. The assembly of claim 5, including an adjustment screw rotatably disposed in the pedal body for adjustably engaging the spring to adjust the bias of the biasing assembly.

8. The assembly of claim 1, wherein one of the shoe plate and the pedal body includes a rib and the other of the shoe plate and the pedal body includes a complementary groove adapted to receive the rib to facilitate alignment of the shoe plate with the pedal body.

9. The assembly of claim 1, wherein the guide slot includes a tapered opening for receiving the shoe post.

10. The assembly of claim 1, wherein the pedal includes a support member adapted to secure the pedal to a crank arm of the bicycle.

11. The assembly of claim 1, wherein the opposing grasps are pivotably movable between the open and the closed positions.

12. The assembly of claim 11, including first and second pivot pins, wherein the opposing grasps pivot about respective ones of the first and second pivot pins.

* * * * *